(12) United States Patent
Kobayashi et al.

(10) Patent No.: US 9,394,195 B2
(45) Date of Patent: Jul. 19, 2016

(54) GLASS PLATE

(71) Applicant: Asahi Glass Company, Limited, Tokyo (JP)

(72) Inventors: Tomoyuki Kobayashi, Tokyo (JP); Yusuke Arai, Tokyo (JP); Yuki Kondo, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/517,487

(22) Filed: Oct. 17, 2014

(65) Prior Publication Data

US 2015/0038316 A1 Feb. 5, 2015

Related U.S. Application Data

(63) Continuation of application No. PCT/JP2013/062295, filed on Apr. 25, 2013.

(30) Foreign Application Priority Data

Apr. 27, 2012 (JP) .................................. 2012-102078

(51) Int. Cl.
| | |
|---|---|
| C03C 3/087 | (2006.01) |
| C03C 3/091 | (2006.01) |
| C03C 3/078 | (2006.01) |
| C03C 3/089 | (2006.01) |
| C03C 4/10 | (2006.01) |

(52) U.S. Cl.
CPC .............. *C03C 3/091* (2013.01); *C03C 3/078* (2013.01); *C03C 3/087* (2013.01); *C03C 3/089* (2013.01); *C03C 4/10* (2013.01)

(58) Field of Classification Search
CPC ................................ C03C 3/089; C03C 3/091
See application file for complete search history.

(56) References Cited

U.S. PATENT DOCUMENTS

| | | | |
|---|---|---|---|
| 5,004,706 A | 4/1991 | Dickinson | |
| 7,141,521 B2 | 11/2006 | Siebers et al. | |
| 8,828,898 B2 | 9/2014 | Arai et al. | |
| 2003/0114291 A1 | 6/2003 | Koyama et al. | |
| 2004/0075086 A1* | 4/2004 | Wolff ..................... | C03C 3/089 252/500 |
| 2008/0113857 A1 | 5/2008 | Lee et al. | |
| 2010/0190630 A1 | 7/2010 | Nishizawa et al. | |
| 2010/0273635 A1 | 10/2010 | Tsuzuki et al. | |
| 2013/0209773 A1* | 8/2013 | Endo ..................... | C03C 3/085 428/220 |
| 2015/0038315 A1* | 2/2015 | Endo ..................... | C03C 3/085 501/59 |

FOREIGN PATENT DOCUMENTS

| | | | |
|---|---|---|---|
| DE | 10149932 | * | 4/2003 |
| JP | 01-230449 | | 9/1989 |
| JP | 4-228450 | | 8/1992 |
| JP | 8-40742 | | 2/1996 |
| JP | 11-310429 | | 11/1999 |
| JP | 2000-159538 | | 6/2000 |
| JP | 2001-180967 | | 7/2001 |
| JP | 2003-12341 | | 1/2003 |
| JP | 2005-247656 | | 9/2005 |
| JP | 2007-238398 | | 9/2007 |
| JP | 4087113 | | 2/2008 |
| JP | 2010-208906 | | 9/2010 |
| WO | WO 01/66477 | | 9/2001 |
| WO | WO 2009/081906 | | 7/2009 |

OTHER PUBLICATIONS

International Search Report issued Jan. 31, 2012 in PCT/JP2011/074724 filed Oct. 26, 2011.
F.N. Steele & R.W. Douglas. "Some observations on the absorption of iron in silicate and borate glasses." Dept. of Glass Technology, University of Sheffield. Physics and Chemistry of Glasses, vol. 6, No. 6, Dec. 1965, pp. 246-252.
International Search Report issued Jul. 2, 2013, in application No. PCT/JP2013/062295 filed on Apr. 25, 2013.

* cited by examiner

*Primary Examiner* — Karl Group
(74) *Attorney, Agent, or Firm* — Oblon, McClelland, Maier & Neustadt, L.L.P

(57) ABSTRACT

To provide a glass plate which can be made to have higher Te than conventional glass plates when its iron content is substantially the same as the conventional glass plates, to have substantially the same level of Te as conventional glass plates when its iron content is larger than the conventional glass plates, or to have very high Te when its iron content is smaller than conventional glass plates, and which presents good productivity. A glass plate which comprises, as represented by mol percentage based on oxides, $SiO_2$: from 57 to 71%, $Al_2O_3$: from 0 to 6%, $B_2O_3$: from 0 to 5%, $Na_2O$: from 10 to 16%, MgO: from 7.5 to 19.8%, and CaO: from 1.6 to 11%, provided that S-value represented by $MgO+Al_2O_3+B_2O_3-Na_2O$ (as represented by mol percentage) is from −10 to 10.5%, and the ratio of the content of MgO, as represented by mol percentage based on oxide, to the content of CaO, as represented by mol percentage based on oxide, ([MgO]/[CaO]), is from 0.8 to 10.

19 Claims, 1 Drawing Sheet

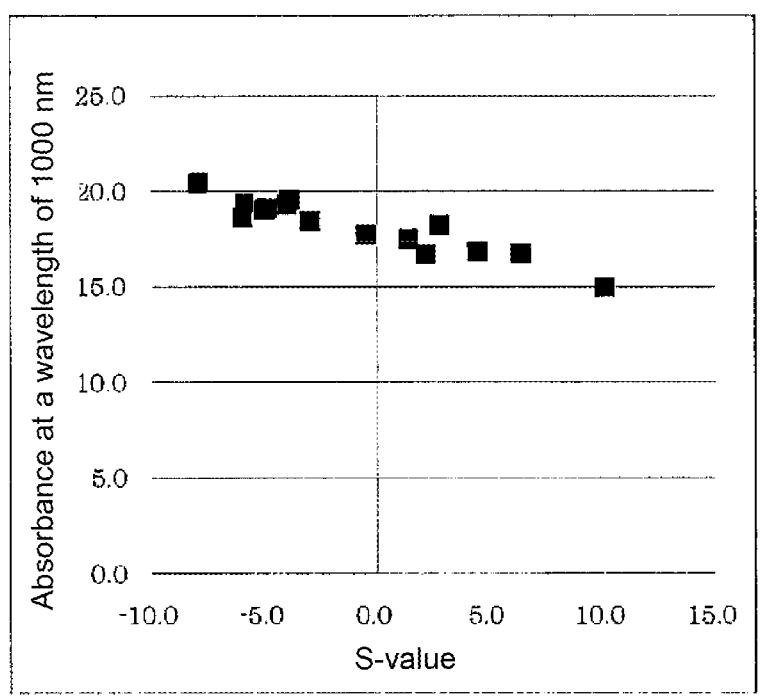

GLASS PLATE

This application is a continuation of PCT Application No. PCT/JP2013/062295, filed on Apr. 25, 2013, which is based upon and claims the benefit of priority from Japanese Patent Application No. 2012-102078 filed on Apr. 27, 2012. The contents of those applications are incorporated herein by reference in their entireties.

TECHNICAL FIELD

The present invention relates to a glass plate having a high solar transmittance.

BACKGROUND ART

In order for a solar cell to be able to generate electric power by light in a visible light region and a near infrared region, a glass plate for the solar cell (such as a cover glass or a glass substrate for a thin-film solar cell) is required to have sufficiently high visible light transmittance (hereinafter referred to as Tv) and solar transmittance (hereinafter referred to as Te).

Further, in solar thermal power generation wherein sunlight is collected and used as a heat source to carry out power generation, a glass plate for a light collecting mirror is required to have sufficiently high Tv and Te in order to minimize a loss of sunlight (particularly light in a near infrared region) as a light collecting mirror.

Therefore, as the glass plate for a solar cell or as the glass plate for a light collecting mirror, a high transmission glass plate (so-called white plate glass) made of soda lime silica glass and having Tv and Te made high by minimizing the content of a coloring component (particularly iron) is used (Patent Document 1).

Further, even a high transmission glass plate contains iron unavoidably included during its production. Therefore, in order to make Te sufficiently high in a high transmission glass plate, it becomes important to increase the proportion of trivalent iron having an absorption peak in the vicinity of a wavelength of 400 nm as much as possible and to reduce the proportion of divalent iron having an absorption peak in a wavelength region from 1,000 nm to 1,100 nm as much as possible, among the total iron contained in the high transmission glass plate (Patent Document 2).

However, such a high transmission glass plate has the following problems.

(i) In order to minimize the content of iron in the high transmission glass plate, it is necessary to minimize the content of iron in glass raw material. However, glass raw material having a minimized content of iron is expensive, and the raw material cost for the high transmission glass plate becomes high.

(ii) In order to minimize the proportion of divalent iron in the high transmission glass plate, it is necessary to lower the temperature of molten glass at the time of producing the high transmission glass plate by a float process or a downdraw method as compared with the case of producing a usual glass plate, and the productivity is thereby poor.

Heretofore, as a method for realizing a high transmittance while solving the above problem (ii), a method of increasing the proportion of trivalent iron among total iron contained in the glass by adding a very small amount of an oxidizing agent, or a method of changing the matrix composition of the soda lime silica glass to move the position of absorption peak of bivalent iron, has been proposed.

For example, by incorporating from 0.025 to 0.20%, as represented by mass percentage, of $CeO_2$ as an oxidizing agent to soda lime silica glass containing from 0.005 to 0.019%, as represented by mass percentage, of the total iron as calculated as $Fe_2O_3$, the proportion of divalent iron having an absorption peak in a wavelength region from 1,000 nm to 1,100 nm is reduced among the total iron contained in the glass plate (Patent Document 3).

Further, it is disclosed that by a soda lime silica glass composition which comprises, as represented by mass percentage, $SiO_2$: from 69 to 75%,
$Al_2O_3$: from 0 to 3%,
$B_2O_3$: from 0 to 5%,
CaO: from 2 to 10%,
MgO: less than 2%,
$Na_2O$: from 9 to 17%,
$K_2O$: from 0 to 8%,
Se: from 0 to 0.002%,
CoO: from 0 to 0.001%,
$Cr_2O_3$: from 0 to 0.001%, and
total iron calculated as $Fe_2O_3$: from 0.02 to 0.2%, wherein the total of oxides of alkaline earth metals is at most 10%, it is possible to move the absorption band by divalent iron towards the long wavelength side, and it is possible to produce window glass which is less colored than a usual soda lime silica glass and which is excellent in infrared absorption (Patent Document 4).

PRIOR ART DOCUMENTS

Patent Documents

Patent Document 1: JP-A-4-228450
Patent Document 2: JP-A-2007-238398
Patent Document 3: Japanese Patent No. 4,087,113
Patent Document 4: JP-A-8-40742

DISCLOSURE OF INVENTION

Technical Problem

By the method disclosed in Patent Document 3, it is certainly possible to increase Te by reducing the proportion of divalent iron having an absorption peak in a wavelength region from 1,000 nm to 1,100 nm among the total iron contained in the glass plate. However, if the glass plate having $CeO_2$ added, is irradiated with ultraviolet rays as disclosed in Patent Document 3, the transmittance decreases substantially particularly from a long wavelength side of the visible region to the infrared region, and consequently, Te is adversely affected. If the added amount is so small that substantially no $CeO_2$ is contained, this problem will not occur, but in such a case, the effect to reduce the proportion of divalent iron among the total iron contained in the glass plate will not be obtained substantially.

Further, by the method disclosed in Patent Document 4, it is possible to move the absorption peak in a wavelength region from 1,000 nm to 1,100 nm by the divalent iron towards the long wavelength side, but there is no substantial change in the absorption quantity, and the influence to Te is very small. For example, in the case of an application wherein sunlight in the visible light region to the near infrared light region is desired to be fully utilized like in the case of a glass plate for a light collecting mirror for solar thermal power generation, it is desired to establish a method to more substantially reduce the absorption peak by divalent iron.

The present invention is to provide a glass plate which can be made to have higher Te than conventional glass plates when its iron content is substantially the same as in the conventional glass plates, to have substantially the same level of Te as conventional glass plates when its iron content is larger than in the conventional glass plates, or to have very high Te when its iron content is smaller than in conventional glass plates, and which presents good productivity.

Solution to Problem

The present invention is to solve the above problem by lowering the absorption peak intensity itself in a wavelength region from 1,000 to 1,100 nm by divalent iron by adjusting the matrix composition of soda lime silica glass.

That is, the glass plate of the present invention is characterized in that it has the following composition (I). The glass plate of the present invention preferably has the following composition (II) and more preferably has the following composition (III).

Advantageous Effects of Invention

The glass plate of the present invention can be made to have higher Te than conventional glass plates when its iron content is substantially the same as in the conventional glass plates, or it can be made to have substantially the same level of Te as conventional glass plates when its iron content is larger than in the conventional glass plates, or it can be made to have very high Te when its iron content is smaller than in conventional glass plates, and it presents good productivity.

BRIEF DESCRIPTION OF THE DRAWING

The FIG. 1 is a graph showing the relation between S-value and the absorbance at a wavelength of 1,000 nm by a glass plate.

DESCRIPTION OF EMBODIMENTS

The glass plate of the present invention is one made of so-called soda lime silica glass which contains $SiO_2$ as the main component and further contains $Na_2O$, CaO, etc.

The glass plate of the present invention has the following composition (I). The glass plate of the present invention preferably has the following composition (II) and more preferably has the following composition (III).

(I) As represented by mol percentage based on oxides,
$SiO_2$: from 57 to 71%,
$Al_2O_3$: from 0 to 6%,
$B_2O_3$: from 0 to 5%,
$Na_2O$: from 10 to 16%,
MgO: from 7.5 to 19.8%, and
CaO: from 1.6 to 11%,
provided that S-value represented by $MgO+Al_2O_3+B_2O_3-Na_2O$ is from −10 to 10.5%, and
[MgO]/[CaO] is from 0.8 to 10.
(II) As represented by mol percentage based on oxides,
$SiO_2$: from 57 to 71%,
$Al_2O_3$: from 0 to 6%,
$B_2O_3$: from 0 to 5%,
$Na_2O$: from 10 to 16%,
MgO: from 7.5 to 19.8%, and
CaO: from 1.6 to 11%,
provided that S-value represented by $MgO+Al_2O_3+B_2O_3-Na_2O$ is from −2 to 10.5%, and
[MgO]/[CaO] is from 0.8 to 10.
(III) As represented by mol percentage based on oxides,
$SiO_2$: from 57 to 71%,
$Al_2O_3$: from 0 to 6%,
$B_2O_3$: from 0 to 5%,
$Na_2O$: from 10 to 16%,
MgO: from 7.5 to 19.8%, and
CaO: from 1.6 to 11%,
provided that S-value represented by $MgO+Al_2O_3+B_2O_3-Na_2O$ is from 0 to 10.5%, and
[MgO]/[CaO] is from 0.8 to 10.

The glass plate of the present invention is made so that it contains, as represented by mol percentage based on oxides, from 7.5 to 19.8% of MgO and from 1.6 to 11% of CaO, and at the same time, the ratio of the content of MgO, as represented by mol percentage based on oxide, to the content of CaO, as represented by mol percentage based on oxide, ([MgO]/[CaO]), is from 0.8 to 10. That is, it is made to have a composition wherein the content of MgO is larger, in both its absolute value and its relative value to the content of CaO, than in usual soda lime silica glass (including a usual high transmission glass plate).

By increasing the content of MgO, it is possible to reduce the proportion of 6-coordinated divalent iron having an absorption peak in a wavelength region from 1,000 to 1,100 nm and to increase the proportion of divalent iron having no absorption peak in a wavelength region from 1,000 to 1,100 nm, thereby to obtain the same effects as in the case where the mass proportion (hereinafter referred to as Redox) of divalent iron calculated as $Fe_2O_3$ in the total iron calculated as $Fe_2O_3$ is reduced. Therefore, even if divalent iron is present to some extent, it is possible to prevent the decrease of Te.

The content of MgO is from 7.5 to 19.8% as represented by mol percentage based on oxides. If the content of MgO exceeds 19.8%, the devitrification temperature tends to increase. The content of MgO is preferably from 8 to 19%, more preferably from 9 to 18%, as represented by mol percentage based on oxides.

[MgO]/[CaO] is from 0.8 to 10. If [MgO]/[CaO] exceeds 10, a bubble layer tends to be formed at a temperature lower than the temperature at which molten glass becomes to have a sufficiently low viscosity (e.g. 100 poise in a case where the glass is produced by a common float process or downdraw process, and therefore, a bubble layer is likely to be substantially formed on the molten glass in the glass melting furnace, thus leading to an adverse effect to the production of a glass plate, such that radiation heat from a heat source such as a burner tends to be hardly transmitted to the molten glass. Further, bubbles are likely to remain in the obtainable glass plate, thus leading to deterioration in the quality of the glass plate. [MgO]/[CaO] is preferably from 1.0 to 10, more preferably from 1.2 to 4.

Further, in conventional soda lime glass, [MgO]/[CaO] as represented by mol percentage based on oxides, is at a level of 0.7. When [MgO]/[CaO] as represented by mol percentage based on oxides, is from 0.8 to 1.5, absorbance by divalent iron can be made low in spite of the composition close to soda lime glass, such being more preferred.

$Fe_2O_3$ is a coloring component which is unavoidably included during the production.

The content of the total iron calculated as $Fe_2O_3$ is from 0 to 0.06%, as represented by mass percentage based on oxide. When the content of the total iron calculated as $Fe_2O_3$ is at most 0.06%, the decrease of Tv can be prevented. $Fe_2O_3$ is often included as an impurity in the raw material. Further, there may be a raw material having a large $Fe_2O_3$ content or a small $Fe_2O_3$ content. In a case where a readily available raw material having a small $Fe_2O_3$ content is used, the content of the total iron calculated as $Fe_2O_3$ is preferably from 0.005 to 0.06%, as represented by mass percentage based on oxide, and more preferably from 0.005 to 0.02%, for a glass plate for a solar cell or a glass plate for a light collecting mirror. Here, the content of the total iron calculated as $Fe_2O_3$ is such that the proportion of the total iron contained is represented by mass percentage when the total of proportions of all components of a glass plate excluding the total iron amount is taken as 100 mass %.

In this specification, the content of the total iron is represented as the amount of $Fe_2O_3$ in accordance with the standard method of analysis. However, the iron present in the glass is not necessarily all present in the form of trivalent iron. Usually, divalent iron is present in the glass. The divalent iron has an absorption peak mainly in a wavelength region from 1,000 nm to 1,100 nm and also has an absorbance at a wavelength shorter than a wavelength of 800 nm, and trivalent iron has an absorption peak mainly in the vicinity of a wavelength of 400 nm. An increase of divalent iron increases the absorbance in a near infrared region around the wavelength region from 1,000 nm to 1,100 nm. As represented by Te, this means that Te decreases. Therefore, when attention is drawn to Tv and Te, it is possible to control the decrease of Tv by controlling the content of the total iron calculated as $Fe_2O_3$ and to control the decrease of Te by increasing trivalent iron than divalent iron. Accordingly, with a view to preventing the decrease of Tv and Te, it is preferred to reduce the total iron content and to control Redox to be low.

In the glass plate of the present invention, Redox is preferably at most 35%. When Redox is at most 35%, it is possible to prevent the decrease of Te. Redox is more preferably at most 30%.

In the present invention, S-value represented by $MgO+Al_2O_3+B_2O_3-Na_2O$, as represented by mol percentage based on oxides in the glass composition, is made to be within a range of from -10 to 10.5%, preferably within a range of from -2 to 10.5, more preferably within a range of from 0 to 10.5, further preferably within a range of from 2 to 10.5. That is, S-value is a value obtained by deducting the content of $Na_2O$ from the total of the content of MgO, the content of $Al_2O_3$ and the content of $B_2O_3$, as represented by mol percentage based on oxides.

It has been found that as this S-value becomes larger within a range of from -10 to 10.5%, it becomes possible to more reduce the influence to absorbance at from about 1,000 to 1,100 nm by divalent iron. It was considered that the absorbance at a wavelength of from about 1,000 to 1,100 would increase by the amount of divalent iron present, but it has been found that the presence of the composition of MgO, $Al_2O_3$, $B_2O_3$ and NaO is influential to the absorbance by divalent iron. This is considered to be such that even though there is no change in the amount of divalent iron present, the proportion of 6-coordinated divalent iron having an absorption peak in a wavelength region of from about 1,000 to 1,100 nm is thereby decreased, and the proportion of divalent iron having no absorption peak in a wavelength region of from about 1,000 to 1,100 nm is thereby increased. It has been found that the absorbance by divalent iron decreases as S-value represented by $MgO+Al_2O_3+B_2O_3-Na_2O$, as represented by mol percentage based on oxides, becomes larger within a range of from -10 to 10.5%, even though the content of divalent iron is the same.

$SiO_2$ is the main component of the glass.

The content of $SiO_2$ is from 57 to 71%, as represented by mol percentage based on oxide. If the content of $SiO_2$ is less than 57%, the stability of the glass tends to decrease. If the content of $SiO_2$ exceeds 71%, the melting temperature of the glass tends to increase, and melting is likely to be difficult. The content of $SiO_2$ is preferably from 60 to 69%, more preferably from 60 to 68%, as represented by mol percentage based on oxide.

$Al_2O_3$ is a component to improve the weather resistance.

The content of $Al_2O_3$ is from 0 to 6%, as represented by mol percentage based on oxide. When $Al_2O_3$ is contained, the weather resistance will be good. By increasing the content of $Al_2O_3$, the high temperature viscosity may be adjusted to improve the bubble quality. However, if the content of $Al_2O_3$ exceeds 6%, the melting property remarkably deteriorates. The content of $Al_2O_3$ is preferably from 0.1 to 5%, more preferably from 0.4 to 5%, as represented by mol percentage based on oxide.

$Na_2O$ is an essential component to accelerate melting of glass raw material.

The content of $Na_2O$ is from 10 to 16%, as represented by mol percentage based on oxide. If the content of $Na_2O$ is less than 10%, melting of the glass tends to be difficult. If the content of $Na_2O$ exceeds 16%, the weather resistance and stability of the glass plate tend to deteriorate. The content of $Na_2O$ is preferably from 11 to 15%, more preferably from 11 to 14%, as represented by mol percentage based on oxide.

$K_2O$ is not essential, but is a component to accelerate melting of glass raw material and to adjust the thermal expansion, viscosity, etc.

The content of $K_2O$ is preferably from 0 to 0.7%, as represented by mol percentage based on oxide. If the content of $K_2O$ exceeds 0.7%, the raw material cost tends to remarkably increase. The content of $K_2O$ is more preferably from 0 to 0.6%, as represented by mol percentage based on oxide.

CaO is a component to accelerate melting of glass raw material or to adjust the viscosity, thermal expansion coefficient, etc., and it is a component to control Redox to be low.

The content of CaO is from 1.6 to 11%, as represented by mol percentage based on oxide. If the content of CaO exceeds 11%, the devitrification temperature tends to increase. The content of CaO is preferably from 2 to 10.5%.

Further, the total content of MgO and CaO is preferably at least 10.5%, as represented by mol percentage based on oxides. If MgO+CaO is less than 10.5%, the viscosity of glass is likely to be too high. Further, melting of glass raw material tends to be difficult.

Further, the upper limit of the total content of MgO and CaO is preferably 20%. If the total content exceeds 20%, the glass tends to be unstable, and in the vitrification step after melting, crystals, etc. are likely to precipitate, such being undesirable.

$Li_2O$ is not essential, but is a component to accelerate melting of glass raw material and to lower the melting temperature.

The content of $Li_2O$ is preferably from 0 to 3%, as represented by mol percentage based on oxide. If the content of $Li_2O$ exceeds 3%, the stability of glass tends to deteriorate. Further, the raw material cost tends to remarkably increase.

$B_2O_3$ is a component to accelerate melting of glass raw material. $B_2O_3$ is not an essential component. In order to increase Te of the glass plate, the content of $B_2O_3$ is preferably adjusted to be from 3 to 5%, as represented by mol percentage based on oxide.

$ZrO_2$ is not essential, but is a component to improve the chemical durability of glass or to improve the physical strength such as the elastic modulus, hardness, etc.

The content of $ZrO_2$ is preferably from 0 to 3%, as represented by mol percentage based on oxide. If the content of $ZrO_2$ exceeds 3%, the melting properties tend to deteriorate, or the devitrification temperature tends to increase.

The glass plate of the present invention may contain $SO_3$ used as a fining agent. The content of total sulfur calculated as $SO_3$ is preferably from 0.01 to 0.5% as represented by mass percentage based on oxide. If the content of total sulfur calculated as $SO_3$ exceeds 0.5%, reboiling is likely to occur in a process of cooling molten glass, whereby the bubble quality is likely to deteriorate. If the content of total sulfur calculated as $SO_3$ is less than 0.01%, a sufficient fining effect may not be obtained. The content of total sulfur calculated as $SO_3$ is more preferably from 0.05 to 0.5%, further preferably from 0.1 to 0.4%, as represented by mass percentage based on oxide.

The glass plate of the present invention may contain $SnO_2$ used as a fining agent. Further, a transparent electrically conductive glass plate having $SnO_2$ laminated as the surface layer of a glass substrate used as a transparent electrode material, may be used as raw material for glass cullet. The content of total tin calculated as $SnO_2$ is preferably from 0 to 1%, as represented by mass percentage based on oxide.

The glass plate of the present invention may contain $Sb_2O_3$ used as a fining agent. The content of total antimony calculated as $Sb_2O_3$ is preferably from 0 to 0.5%, as represented by mass percentage based on oxide. If the content of total antimony calculated as $Sb_2O_3$ exceeds 0.5%, the glass plate after forming is likely to be turbid in the case of a float process. The content of total antimony calculated as $Sb_2O_3$ is more preferably from 0 to 0.1%, as represented by mass percentage based on oxide.

It is preferred that the glass plate of the present invention does not substantially contain S, NiO, $MoO_3$, CoO, $Cr_2O_3$, $V_2O_5$ or MnO as a coloring component. Here, "does not substantially contain S, NiO, $MoO_3$, CoO, $Cr_2O_3$, $V_2O_5$ or MnO" means that the glass plate does not contain S, NiO, $MoO_3$, CoO, $Cr_2O_3$, $V_2O_5$ or MnO at all, or may contain S, NiO, $MoO_3$, CoO, $Cr_2O_3$, $V_2O_5$ or MnO as an impurity unavoidably included in the production. When the glass plate does not substantially contain S, NiO, $MoO_3$, CoO, $Cr_2O_3$, $V_2O_5$ or MnO, the decrease of Tv and Te can be prevented.

Te of the glass plate of the present invention (calculated in a thickness of 4 mm) is preferably at least 80%, more preferably at least 82.7%. Te is a solar transmittance calculated by measuring the transmittance by a spectrophotometer in accordance with JIS R3106 (1998) (hereinafter referred to simply as JIS R3106).

Further, in a case where the content of $Fe_2O_3$ as a coloring component in the composition of the glass plate is at most 0.01 mass %, Te (calculated in a thickness of 4 mm) is preferably at least 90%, more preferably at least 91%, further preferably at least 91.5%.

Tv of the glass plate of the present invention (calculated in a thickness of 4 mm) is preferably at least 80%, more preferably at least 82%. Tv is a visible light transmittance calculated by measuring the transmittance by a spectrophotometer in accordance with JIS R3106. As coefficients, values of standard light source A and 2 degree angled configuration are used.

Further, in a case where the content of $Fe_2O_3$ as a coloring component in the composition of the glass plate is at most 0.01 mass %, Tv (calculated in a thickness of 4 mm) is preferably at least 90%, more preferably at least 91%.

The glass plate of the present invention is useful as a glass plate for a solar cell or as a glass plate for a light collecting mirror. When it is used as a glass plate for a solar cell, it may be used as a cover glass or as a glass substrate for a thin film solar cell.

In the process for producing a glass plate of the present invention, it is possible to prevent the decrease of Te of the obtainable glass plate, even if the temperature of molten glass is made high so that the proportion of divalent iron tends to be high. Thus, the process for producing a glass plate of the present invention is suitable for a float process or downdraw process wherein the temperature of molten glass is high.

In the above-described glass plate of the present invention, S-value represented by $MgO+Al_2O_3+B_2O_3-Na_2O$, as represented by mol percentage based on oxides, is made to be within a range of from −10 to 10.5%, whereby it is considered that even though there is no change in the content of divalent iron, the proportion of 6-coordinated divalent iron having an absorption peak in a wavelength region of from about 1,000 to 1,100 nm is decreased, and the proportion of divalent iron having no absorption peak in a wavelength region of from about 1,000 to 1,100 nm is increased. Therefore, the glass plate of the present invention can be made to have higher Te than conventional glass plates when its iron content is substantially the same as in the conventional glass plates, or it can be made to have substantially the same level of Te as conventional glass plates when its iron content is larger than in the conventional glass plates, or it can be made to have very high Te when its iron content is smaller than in conventional glass plates.

And, it is possible to obtain a glass plate having sufficiently high Te even when the iron content in the glass plate is made relatively large, and therefore, it is possible to use glass raw material having relatively large iron content (i.e. relatively inexpensive glass raw material), whereby the production cost of the glass plate can be made low.

Further, even when the temperature of molten glass at the time of producing a glass plate of the present invention by a float process or downdraw process, is made to be a higher temperature (i.e. the same temperature as in the case of producing a usual glass plate by a float process or downdraw process), so that Redox (the proportion of divalent iron) becomes high to some extent, it is possible to decrease the proportion of 6-coordinated divalent iron having an absorption peak in a wavelength region of from 1,000 to 1,100 nm and to increase the proportion of divalent iron having no absorption peak in a wavelength region of from 1,000 to 1,100, whereby it is possible to obtain a glass plate having sufficiently high Te. Thus, it is possible to produce a glass plate having high Te with good productivity.

EXAMPLES

Now, the present invention will be described in detail with reference to Examples, but it should be understood that the present invention is by no means limited to such specific Examples.

(Redox)

The amount of $Fe_2O_3$ in the obtained glass plate is the content (%=mass percentage) of total iron calculated as $Fe_2O_3$ obtained by a fluorescent X-ray measurement.

The amount of divalent iron in the glass plate required for the calculation of Redox is quantified by a wet-system analytical method. Specifically, the obtained glass plate is pulverized, and the glass powder is dissolved in hydrogen fluoride and mixed with bipyridyl and an ammonium acetate solution to let it form a color, the absorption peak intensity of which is measured, whereupon based on a calibration curve preliminarily prepared by a standard sample, the amount of divalent iron is quantified.

(Te)

The obtained glass plate was polished to a thickness of 4 mm, and the solar transmittance (Te) as stipulated in JIS R3106 was measured.

(Absorbance at a Wavelength of 1,000 nm)

The absorbance at a wavelength of 1,000 nm by a glass plate was obtained as an absorption coefficient per Fe=1 wt % per unit thickness (10 mm) by the following formula (1).

$$-\{\ln(T_{1000})-\ln(R_{1000})\}/\{Fe_2O_3(wt\%) \times redox/100\} \times 10/4 \quad (1)$$

Here, $T_{1000}$ is a transmittance at a wavelength of 1,000 nm obtained by measuring a glass plate having a thickness of 4 mm by a spectrophotometer (U-4100, manufactured by Hitachi Ltd.). $R_{1000}$ is a loss by reflection at a wavelength of 1,000 nm. Here, $R_{1000}$ is a value calculated from the refractive index. That is, when the refractive index of glass is represented by $n_1$, the reflectance $R_1$ at the interface between air and the glass is obtained by the following formula (2):

$$R_1 = (n_1-1)^2/(n_1+1)^2 \quad (2)$$

The reflection loss R in the absence of light absorption is obtainable by the following formula (3):

$$R = (1-R_1)^2 \quad (3)$$

Here, the refractive index at a wavelength of 1,000 nm was obtained by obtaining refractive indices at five other wavelengths, followed by extrapolation from the Sellmeier equation.

With respect to Examples 1 to 15 wherein the glass composition was varied, S-value, Te and the absorbance at a wavelength of 1,000 nm were obtained and shown in Tables 1 and 2. Here, in Tables 1 and 2, the absorbance at a wavelength of 1,000 nm is shown as "Abs (1000 nm)".

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 68.0 | 70.0 | 69.0 | 69.0 | 69.0 | 69.0 | 69.0 | 69.0 |
| $Al_2O_3$ | 0.0 | 0.5 | 0.8 | 0.5 | 0.8 | 0.5 | 0.8 | 0.5 |
| $B_2O_3$ | 0.0 | 0.0 | 0.0 | 0.0 | 0.0 | 0.0 | 0.0 | 0.0 |
| MgO | 8.0 | 7.5 | 8.3 | 9.5 | 9.3 | 10.5 | 10.3 | 10.5 |
| CaO | 8.0 | 8.0 | 7.0 | 6.0 | 6.0 | 5.0 | 5.0 | 5.0 |
| $Na_2O$ | 16.0 | 14.0 | 15.0 | 15.0 | 15.0 | 15.0 | 15.0 | 14.0 |
| Redox | 28.1 | 30.5 | 28.6 | 26.7 | 26.8 | 25.2 | 23.1 | 26.3 |
| $Fe_2O_3$ *1 | 1030 | 980 | 1010 | 1040 | 1040 | 1050 | 1060 | 1060 |
| S-value | −8.0 | −6.0 | −5.9 | −5.0 | −4.9 | −4.0 | −3.9 | −3.0 |
| MgO/CaO | 1.0 | 0.9 | 1.2 | 1.6 | 1.6 | 2.1 | 2.1 | 2.1 |
| Abs (1000 nm) | 20.5 | 18.6 | 19.4 | 19.0 | 19.1 | 19.4 | 19.6 | 18.4 |
| Te (4 mm) | 81.6 | 82.2 | 82.1 | 82.6 | 82.6 | 82.9 | 82.5 | 83 |
| Peak λ (nm) | 1000 | 1025 | 1014 | 1010 | 1001 | 1023 | 1006 | 1011 |

*1: mass percentage for $Fe_2O_3$ only

TABLE 2

|  | Ex. 9 | Ex. 10 | Ex. 11 | Ex. 12 | Ex. 13 | Ex. 14 | Ex. 15 |
|---|---|---|---|---|---|---|---|
| $SiO_2$ | 65.0 | 65.0 | 68.0 | 62.0 | 65.0 | 65.0 | 70.0 |
| $Al_2O_3$ | 3.0 | 3.0 | 0.0 | 6.0 | 3.0 | 3.0 | 6.0 |
| $B_2O_3$ | 0.0 | 0.0 | 0.0 | 0.0 | 5.0 | 5.0 | 0.0 |
| MgO | 9.5 | 14.4 | 15.2 | 12.8 | 9.5 | 14.4 | 17.1 |
| CaO | 9.5 | 1.6 | 3.8 | 3.2 | 9.5 | 1.6 | 1.9 |
| $Na_2O$ | 13.0 | 16.0 | 13.0 | 16.0 | 13.0 | 16.0 | 13.0 |
| Redox | 28.3 | 25.9 | 27.5 | 23.5 | 22.6 | 21.8 | 27.0 |
| $Fe_2O_3$ *1 | 1020 | 1030 | 1010 | 1040 | 1130 | 1120 | 1030 |
| S-value | −0.5 | 1.4 | 2.2 | 2.8 | 4.5 | 6.4 | 10.1 |
| MgO/CaO | 1.0 | 9.0 | 4.0 | 4.0 | 1.0 | 9.0 | 9.0 |
| Abs (1000 nm) | 17.7 | 17.5 | 16.7 | 18.2 | 16.8 | 16.7 | 15.0 |
| Te (4 mm) | 82.5 | 83.5 | 83.6 | 83.7 | 83.5 | 84.2 | 84.1 |
| Peak λ (nm) | 1010 | 984 | 1000 | 986 | 1037 | 997 | 978 |

*1: mass percentage for $Fe_2O_3$ only

The relation between S-value and the absorbance at a wavelength of 1,000 nm is shown in FIG. 1. It is evident from the total iron and the divalent amount "Redox" that the content of divalent iron is substantially the same in the composition of each Example, but the absorbance at a wavelength of 1,000 nm tends to decrease as S-value increases within a range of from −10 to 10.5. This indicates that Te becomes high, as S-value increases within a range of from −10 to 10.5. Thus, even though the amount of divalent iron causing absorption at a wavelength of 1,000 nm is constant, it is possible, by adjusting S-value, to adjust the absorbance (i.e. Te) at a wavelength of 1,000 nm and to obtain a glass composition whereby the absorbance at a wavelength of 1,000 nm is low (i.e. Te is large).

INDUSTRIAL APPLICABILITY

The glass plate of the present invention is useful as a glass plate for a solar cell (such as a cover glass or a glass substrate for a thin-film solar cell), a glass plate for a light collecting mirror in solar thermal power generation, etc.

What is claimed is:

1. A glass plate which comprises, as represented by mol percentage based on oxides,
   $SiO_2$: 57 to 71%,
   $Al_2O_3$: 0.5 to 6%,
   $B_2O_3$: 0 to 5%,
   $Na_2O$: 10 to 16%,
   MgO: 7.5 to 19.8%, and
   CaO: 1.6 to 8.0%,
   provided that S-value represented by MgO+$Al_2O_2$+$B_2O_3$—$Na_2O$ (as represented by mol percentage) is −10 to 10.5%, and
   the ratio of the content of MgO, as represented by mol percentage based on oxide, to the content of CaO, as represented by mol percentage based on oxide, ([MgO]/[CaO]), is 0.9375 to 10.

2. The glass plate according to claim 1, wherein the S-value is −2 to 10.5%.

3. The glass plate according to claim 1, wherein the S-value is 0 to 10.5%.

4. The glass plate according to claim 1, wherein the mol percentage of $B_2O_3$ is
   $B_2O_3$: 3 to 5%.

5. The glass plate according to claim 1, wherein the ratio of [MgO]/[CaO] is 0.9375 to 1.5.

6. The glass plate according to claim 1, which comprises, as represented by mol percentage based on oxides:
   $SiO_2$: 60 to 69%,
   $Al_2O_3$: 0.5 to 3.0%,
   $B_2O_3$: 0%,
   $Na_2O$: 11 to 15%,
   MgO: 9 to 18%, and
   CaO: 3.2 to 5%,
   provided that S-value represented by MgO+$Al_2O_3$+$B_2O_3$—$Na_2O$ (as represented by mol percentage) is −3.0 to 2.2%, and
   the ratio of the content of MgO, as represented by mol percentage based on oxide, to the content of CaO, as represented by mol percentage based on oxide, ([MgO]/[CaO]), is 1.8 to 4.

7. The glass plate according to claim 1, which comprises, as represented by mol percentage based on oxides:
   $SiO_2$: 65 to 68%,
   $Al_2O_3$: 0.8 to 3.0%,
   $B_2O_3$: 0%,
   $Na_2O$: 14.0 to 15.0%,
   MgO: 10.5 to 12.8%, and CaO: 3.8 to 5%,
K$_2$O: 0 to 0.7%,
provided that S-value represented by MgO+Al$_2$O$_3$+B$_2$O$_3$—Na$_2$O (as represented by mol percentage) is −0.5 to 1.4%, and
the ratio of the content of MgO, as represented by mol percentage based on oxide, to the content of CaO, as represented by mol percentage based on oxide, ([MgO]/[CaO]), is 2.1 to 4.

8. The glass plate according to claim 1, wherein a content of total iron calculated as Fe$_2$O$_3$ is 0 to 0.06% as represented by mass percentage based on oxide.

9. The glass plate according to claim 1, wherein
the Te of the glass plate is at least 80%, and
the Tv of the glass plate is at least 80%,
each as calculated a thickness of 4 mm by measuring transmittance by a spectrophotometer in accordance with JIS R3106.

10. The glass plate according to claim 1, wherein
the Te of the glass plate is at least 82.7%, and
the Tv of the glass plate is at least 82%,
each as calculated in a thickness of 4 mm by measuring transmittance by a spectrophotometer in accordance with JIS R3106.

11. The glass plate according to claim 6, wherein a content of total iron calculated as Fe$_2$O$_3$ is 0 to 0.06% as represented by mass percentage based on oxide.

12. The glass plate according to claim 6, wherein
the Te of the glass plate is at least 80%, and
the Tv of the glass plate is at least 80%,
each as calculated in a thickness of 4 mm by measuring transmittance by a spectrophotometer in accordance with JIS R3106.

13. The glass plate according to claim 6, wherein
the Te of the glass plate is at least 82.7%, and
the Tv of the glass plate is at least 82%,
each as calculated in a thickness of 4 mm by measuring transmittance by a spectrophotometer in accordance with JIS R3106.

14. The glass plate according to claim 7, wherein a content of total iron calculated as Fe$_2$O$_3$ is 0 to 0.06% as represented by mass percentage based on oxide.

15. The glass plate according to claim 7, wherein
the Te of the glass plate is at least 80%, and
the Tv of the glass plate is at least 80%,
each as calculated in a thickness of 4 mm by measuring transmittance by a spectrophotometer in accordance with JIS R3106.

16. The glass plate according to claim 7, wherein
the Te of the glass plate is at least 82.7%, and
the Tv of the glass plate is at least 82%,
each as calculated in a thickness of 4 mm by measuring transmittance by a spectrophotometer in accordance with JIS R3106.

17. A solar cell or a light collecting mirror comprising the glass plate according to claim 1.

18. A solar cell or a light collecting mirror comprising the glass plate according to claim 6.

19. A solar cell or a light collecting mirror comprising the glass plate according to claim 7.

* * * * *